United States Patent [19]

Hobart et al.

[11] 3,790,325

[45] Feb. 5, 1974

[54] MAGNETIC TAPE TIP CUTTER

[75] Inventors: William M. Hobart, Whitinsville; Allan C. Wainio, Maynard, both of Mass.

[73] Assignee: Honeywell Information Systems Inc., Waltham, Mass.

[22] Filed: Sept. 27, 1971

[21] Appl. No.: 184,087

[52] U.S. Cl. .................................... 425/299, 83/588

[51] Int. Cl. .................................... B29c 1/14

[58] Field of Search ... 425/289, 293, 299, 407, 398; 83/2, 9, 395, 588, 590, 682–685, 695; 264/93, 154, 163, 67, DIG. 58

[56] References Cited

UNITED STATES PATENTS

| | | | |
|---|---|---|---|
| 3,337,664 | 8/1967 | Lyon | 264/93 X |
| 2,797,653 | 7/1957 | Rade | 425/299 X |
| 3,304,857 | 2/1967 | Schmidt | 83/2 X |
| 1,932,922 | 10/1933 | Brown | 83/588 X |
| 1,959,813 | 5/1934 | Caron | 83/395 |
| 2,374,942 | 5/1945 | Kurtz | 164/67 X |
| 3,111,914 | 11/1963 | Viviano | 425/289 |
| 3,502,761 | 3/1970 | Dimitracopoulos | 264/163 X |
| 3,531,555 | 9/1970 | Tiffin | 264/93 X |

*Primary Examiner*—J. Spencer Overholser
*Assistant Examiner*—John S. Brown
*Attorney, Agent, or Firm*—Ronald T. Reiling

[57] ABSTRACT

A method and apparatus are disclosed for forming a novel magnetic tape tip for use with automatic tape threading storage devices. The magnetic tape tip is formed by cutting a half round tip in the tape and simultaneously forming a protrusion on the oxide side of the tape. The protrusion is formed in such a manner as to insure that the tape oxide surface is merely plastically deformed and not totally penetrated. The protrusion within the tape tip allows for the tip to be separated from the underlying reeled tape. This facilitates easy access of the tape tip by automatic threading devices.

10 Claims, 4 Drawing Figures

INVENTORS
WILLIAM M. HOBART
ALLAN C. WAINIO

MAGNETIC TAPE TIP CUTTER

This invention relates to magnetic tape apparatus and in particular to apparatus used in forming a particular type of tip on a portion of magnetic tape.

Tape handling equipment typically used in data processing systems today is fully automated from the time the tape reel is placed on the reel drive until the tape is returned to an off line storage location. This fully automated equipment usually includes an automatic threading routine whereby the tape is caused to be peeled from a reel and automatically inserted into a transducing chamber and thence on to a take-up reel. It is with regard to the initial peeling off of the tape tip that this invention is primarily concerned. In particular, this invention deals with a cutting apparatus for forming a tape tip that is easily handled by automatic threading equipment in initially peeling the tape from the reel.

Previous tape cutting apparatus has often consisted of a cutting mechanism that merely formed a smooth leading edge on the magnetic tape. The resulting tape tip was easily insertable into various passages of the tape handling equipment once it was peeled from the tape reel itself. More recently, a cutter has been developed which forms a slight rise in the tape at the extreme leading edge. This rise causes the tape tip not to lie perfectly flat over the previous wrap of reeled tape. The tape tip is thus more easily lifted by a jet of air which is normally applied by the automatic threading equipment for the purpose of initially peeling the tape tip from the reel of tape. This latter cutting apparatus however does not provide the smooth leading edge which is easily insertable into various portions of the tape handling equipment. Moreover, the rise in the tape often penetrates the tape surface to thereby cause a cut or slit in the tape which may extend to the leading edge itself.

It is therefore an object of this invention to provide a magnetic tape tip for automatic tape threading which contains a smooth leading edge as well as a gradual transitional protrusion immediate to the smooth leading edge.

It is another object of this invention to provide a magnetic tape tip cutter which produces the aforementioned magnetic tape tip for automatic threading.

It is a still further object of this invention to provide a magnetic tape tip cutter which produces a smooth transitional protrusion immediate to the tape tip without totally penetrating the deformed surface.

SUMMARY OF THE INVENTION

To achieve the above-mentioned objects, the present invention comprises a tape tip cutter which simultaneously cuts a half round leading edge in a portion of magnetic tape and also dimples the tape to provide a protrusion on the oxide side of the tape. The protrusion in the tape is accomplished by dimpling the tape only a limited amount adjacent the tip while at the same time cutting the tape tip. The oxide surface of the tape is merely plastically deformed and is not totally penetrated thus avoiding any slitting or cutting. The resulting dimpled tape is easily peeled from the reel by normal peel jet action commonly associated with automatic threading equipment.

DESCRIPTION OF THE PREFERRED EMBODIMENT

Figure 2:
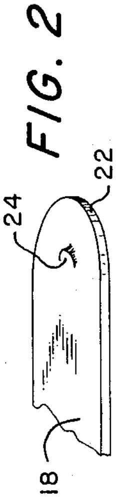
FIG. 2 is a perspective view of the tape tip resulting from the cutting action of the tape tip cutter of FIG. 1.
Figure 1:
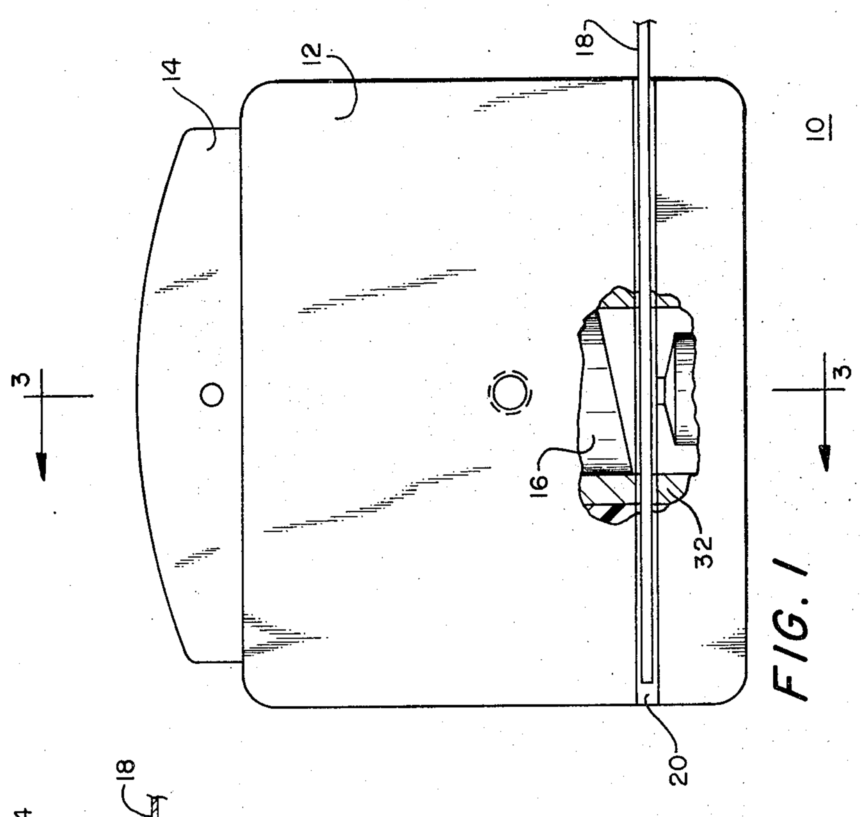
FIG. 1 is a side view of the tape tip cutter with a portion of tape inserted therein.

Referring to FIG. 1, a tape tip cutter 10 is seen to include a casing 12 with a depressable handle 14 mounted at the top thereof. The depressable handle 14 is connected to a cutting blade 16 in such a manner as to cause the blade to move downwardly so as to thereby cut a strip of magnetic tape 18 inserted within a slot 20. Upon depression of the depressable handle 14, the cutter 16 is caused to move downwardly over the positioned magnetic tape 18 so as to cut the tape 18 to a half round tip 22 as shown in FIG. 2. As the tape 18 is being cut, it is also being dimpled in a manner which will be discussed hereinafter so as to produce a protrusion 24 as shown in FIG. 2. The tape 18 is positioned oxide side up within the slot 20 so as to form the protrusion 24 on that side of the tape. The protrusion 24 should always be made in this manner since the tape 18 is to be wound with the oxide surface facing inwardly on the reel of tape. The protrusion 24 facing inwardly causes the half round tip 22 to be separated from the underlying reeled tape so as to be readily peeled by the automatic threading mechanism of the tape handler.

Figure 3:
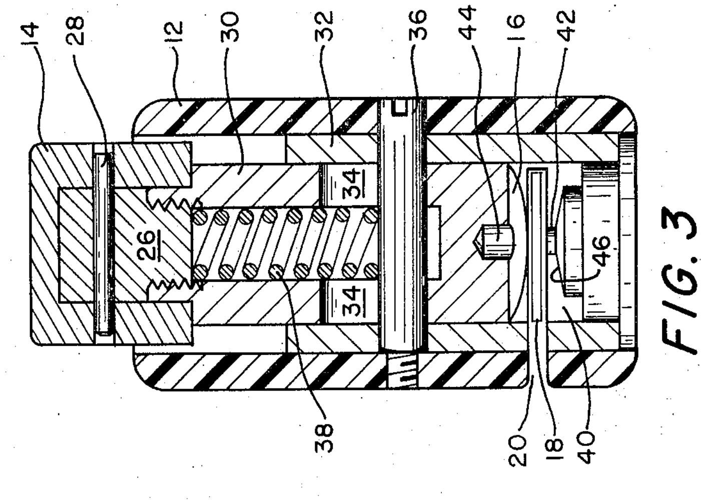
FIG. 3 is a sectional view along line 3—3 of FIG. 1 illustrating the interior portion of the tape tip cutter.

Referring now to FIG. 3 wherein the previously mentioned elements have been similarly labeled for ease of recognition, it is first seen that the depressable handle 14 is attached to an insert 26 by a spring pin 28. The insert 26 threads into a piston 30 which in turn slidably engages an outer hollow cylinder 32. The piston 30 is suspended within the hollow cylinder 32 by virtue of a slot 34 which is normally biased against a screw pin 36 by a recessed coil spring 38. The piston 30 moves down within the outer hollow cylinder 32 when suitable force is applied to the depressable handle 14 to thus compress the recessed coil spring 38. The cutting blade 16 is seen to be formed in the bottom portion of the piston 30 that lies beneath the slot 34. Hence, when the piston 30 moves downwardly the cutting blade 16 moves into the slot 20 to thereby cut the positioned tape 18.

Figure 4:
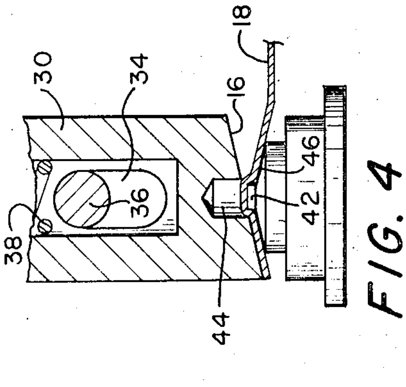
FIG. 4 is a schematic showing of the simultaneous cutting and dimpling action of the tape tip cutter.

As has been previously mentioned, the tape 18 is simultaneously dimpled as it is being cut. The dimpling of the tape takes place as the cutting blade 16 moves the tape 18 downwardly into a bottom well 40 and hence over a dimpler 42 suitably mounted therein as shwon in FIG. 3. Referring now to FIG. 4, it is seen that the dimpler 42 extends into a recess 44 within the cutting blade 16 when the latter moves the tape 18 downwardly thereover. The tape 18 is constantly being deformed over the dimpler 42 as it is being moved into the recess 44. In order to prevent the tape 18 from rupturing as it is thus being deformed, an angled relief surface 46 is inclined downwardly from the dimpler 42. The preferred angle of relief for the relief surface is approximately 12° from the horizontal. The angled relief surface 46 provides for a gradual deformation of the beginning of the perforation 24. The relief surface 46 limits the travel of the cutting blade 16 relative to the dimpler 42 so as to define the height of the protrusion 24.

The dimpler 42 must be of adequate size and dimension to form the protrusion 24. At the same time, it must be small enough to prevent undue deformation of the tape 18 that might result in tape rupture or surface penetration. In accordance with the foregoing criteria, it has been found that a cylinder of diameter 0.093 inches and height 0.016 inches is the preferred dimensional shape of the dimpler 42. It has been furthermore found that the cylindrical height may vary up to 0.025 inches without causing the surface rupture of penetration of the tape. The height may be decreased to as little as 0.012 inches and still produce a definable protrusion 24. The diameter can vary ±0.005 inches within this range of height. It is merely to be noted that the recess 44 must be of such a size as to be capable of smoothly conforming the tape 18 to the dimpler 42 as the dimpling action takes place.

It is thus seen that a magnetic tape tip cutter has been provided which simultaneously produces a half round leading edge together with a protrusion which may be readily used in an automatic tape threading equipment. The half round leading edge plus the protrusion are both accomplished without degrading the surface of the tape so as to thereby result in a tape tip which is both easily accessable as well as easily moveable through the various threading conduits within the tape equipment.

We claim:

1. A magnetic tape cutting apparatus comprising:
means for receiving a length of magnetic tape;
means for cutting the length of tape width-wise, said cutting means having a cutting edge, said cutting means furthermore being slidably mounted entirely above said receiving means and moveable in a downward direction so as to pass through said receiving means, said cutting means having an upwardly extending recess;
means for limiting the downward motion of said cutting means, said limiting means positioned opposite said cutting means and beneath said receiving means; and
means for dimpling the length of tape immediate to the width-wise cut, said dimpling means mounted on said limiting means so as to extend upwardly toward said recess within said cutting means.

2. The apparatus of claim 1 wherein said limiting means comprises an angled relief surface extending downwardly to either side of said dimpling means.

3. The apparatus of claim 2 wherein said dimpling means comprises:
a cylinder of height less than or equal to 0.025 inches but greater than or equal to 0.012 inches.

4. The apparatus of claim 3 wherein said means for cutting the tape comprises:
a cutting edge inclined at the slope of said angled relief surface.

5. The apparatus of claim 1 further comprising:
means for normally retaining said cutting means above the tape; and
means for guiding said cutting means as it travels downwardly toward the tape positioned within said receiving means.

6. The apparatus of claim 5 wherein said retaining means comprises:
a slot within said cutting means;
a pin inserted through said guide means and said slot; and
a spring located within a recess of said cutting means so as to compressibly load the bottom of said slot against said pin.

7. A magnetic tape cutting apparatus comprising:
a casing provided with an opening for receiving an end of a length of magnetic tape;
means for cutting the tape end to a rounded tape tip, said cutting means having a round cutting edge which is less than or equal to a semi-circular arc, and having a recess located adjacent to said cutting edge, said cutting means mounted within said casing so as to be moveable in a direction toward the opening and so as to be capable of passing through the operning to thereby cut said tape end which has been positioned within the opening;
means for dimpling the end of the tape, said dimpling means comprising a cylinder mounted opposite said cutting means so as to be insertable into the recess within said cutting means as said cutting means passes through the opening in the casing; and
means for limiting the distance which said dimpling means inserts into the recess of said cutting means.

8. The apparatus of claim 7 wherein said dimpling means is mounted on said limiting means and said limiting means comprises:
An angled relief surface extending downwardly from said dimpling means.

9. The apparatus of claim 8 wherein said dimpling means comprises:
a cylinder of height less than or equal to 0.025 inches but greater than or equal to 0.012 inches.

10. The apparatus of claim 7 further comprising means for normally retaining said cutting means in a position removed from the opening, said retaining means comprising:
a slot within said cutting means;
a pin inserted through said casing and said slot; and
a spring located within a recess of said cutting means so as to compressibly load the bottom of said slot against said pen.

* * * * *